United States Patent
Wang et al.

(10) Patent No.: US 11,579,856 B2
(45) Date of Patent: Feb. 14, 2023

(54) MULTI-CHIP COMPATIBLE COMPILING METHOD AND DEVICE

(71) Applicant: SOOCHOW UNIVERSITY, Suzhou (CN)

(72) Inventors: Yihuai Wang, Suzhou (CN); Jiale Jiang, Suzhou (CN); Jin Wang, Suzhou (CN); Lianmin Shi, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/782,459

(22) PCT Filed: Dec. 24, 2020

(86) PCT No.: PCT/CN2020/139004
§ 371 (c)(1),
(2) Date: Jun. 3, 2022

(87) PCT Pub. No.: WO2021/258692
PCT Pub. Date: Dec. 30, 2021

(65) Prior Publication Data
US 2023/0004368 A1    Jan. 5, 2023

(30) Foreign Application Priority Data

Jun. 24, 2020    (CN) .......................... 202010590515.7

(51) Int. Cl.
*G06F 8/41*    (2018.01)
(52) U.S. Cl.
CPC ............... *G06F 8/47* (2013.01); *G06F 8/447* (2013.01)
(58) Field of Classification Search
CPC .................................. G06F 8/47; G06F 8/447
(Continued)

(56) References Cited

U.S. PATENT DOCUMENTS 6,487,713 B1 * 11/2002 Cohen ....................... G06F 8/71
717/105
8,881,122 B1 * 11/2014 Klimek ................... G06F 8/427
717/140
(Continued)

FOREIGN PATENT DOCUMENTS

CN    103064722 A    4/2013
CN    103279356 A    9/2013
(Continued)

OTHER PUBLICATIONS

Title: Detecting semantic changes in makefile build code, author: Jafar M et al, Published on 2012.*
(Continued)

*Primary Examiner* — Chameli Das
(74) *Attorney, Agent, or Firm* — SZDC Law P.C.

(57) ABSTRACT

A multi-chip compatible compiling method includes: extracting common characteristic information of Makefiles; configuring variable attribute information of the Makefiles; obtaining a universal Makefile template for multiple chips according to the common characteristic information and the variable attribute information of the Makefiles; traversing a project to be compiled in the universal Makefile template by a compilation module, recording path information of a dependency file of the project to be compiled, replacing a variable value in the universal Makefile template, and determining automation configuration information of the universal Makefile template; invoking an incremental compilation mechanism of a Make tool according to the automation configuration information of the universal Makefile template to obtain a target Makefile of the project to be compiled; and processing the target Makefile by rule information and pseudo-target tag information in the Makefiles to obtain an executable file generated by compilation.

8 Claims, 2 Drawing Sheets

(58) Field of Classification Search
USPC .......................................................... 717/140
See application file for complete search history.

(56) References Cited

U.S. PATENT DOCUMENTS

| | | | | |
|---|---|---|---|---|
| 2004/0194060 A1* | 9/2004 | Ousterhout | ........... | G06F 9/5072 |
| | | | | 714/E11.2 |
| 2005/0149898 A1* | 7/2005 | Hakewill | ............ | G06F 9/30145 |
| | | | | 712/E9.05 |
| 2016/0103677 A1* | 4/2016 | Melski | .................. | G06F 9/5038 |
| | | | | 717/120 |

FOREIGN PATENT DOCUMENTS

| | | |
|---|---|---|
| CN | 110737429 A | 1/2020 |
| CN | 111796831 A | 10/2020 |
| EP | 2498178 A1 | 9/2012 |

OTHER PUBLICATIONS

Title: Build system analysis with link prediction, author: X Xia et al, Published on 2014.*
Nie, Zhonglong et al. "Design of a retargetable embedded integrated development environment" Microcontrollers & Embedded Systems, No. 8, pp. 8-10, Dec. 31, 2007.

* cited by examiner

MULTI-CHIP COMPATIBLE COMPILING METHOD AND DEVICE

This application is the National Stage Application of PCT/CN2020/139004, filed on Dec. 24, 2020, which claims priority to Chinese Patent Application No. 202010590515.7, filed on Jun. 24, 2020, which is incorporated by reference for all purposes as if fully set forth herein.

FIELD OF THE DISCLOSURE

The present invention relates to the field of software development technologies, and particularly to a multi-chip compatible compiling method and device.

BACKGROUND OF THE DISCLOSURE

With rapid development of various Internet of Things applications, an embedded integrated development environment (IDE) receives wide attention as an application development platform thereof. The embedded IDE refers in particular to a software development platform which is oriented to embedded application development and has characteristics of engineering management, cross compilation, cross debugging, program downloading, or the like. The rapid development of the Internet of Things application greatly stimulates development demands for embedded software, and meanwhile puts forward higher requirements for functionality and adaptability of the embedded IDE.

However, the applicant of the present invention finds that a prior art has at least the following technical problem: most existing embedded IDEs only support compilation of a chip or a chip from a specific manufacturer, resulting in insufficient compilation compatibility and adaptability of the embedded IDE to different microcontrollers.

SUMMARY OF THE DISCLOSURE

Embodiments of the present invention provide a multi-chip compatible compiling method and device, which solve the technical problem that most embedded IDEs in a prior art only support compilation of a chip or a chip from a specific manufacturer, resulting in insufficient compilation compatibility and adaptability of the embedded IDE to different microcontrollers, and achieve the technical effect that a universal IDE compiling module has enhanced flexibility and expandability and is applicable to compilation of various chips, thus improving compiling adaptability.

In order to achieve the above object, the technical solution provided by an embodiment of the present invention is as follows:

A multi-chip compatible compiling method, comprising: obtaining Makefile in a file directory, and extracting common feature information of Makefile; setting variable attribute information of Makefile through a function supported in Makefile; obtaining a universal Makefile template for plural chips according to the common feature information and the variable attribute information of Makefile; traversing a to-be-compiled project in the universal Makefile template by a compiling module, recording dependent file path information of the to-be-compiled project, replacing a first variable value in the universal Makefile template, and determining automatic configuration information of the universal Makefile template; calling an incremental compiling mechanism of Make according to the automatic configuration information of the universal Makefile template to obtain target Makefile of the to-be-compiled project; and processing target Makefile according to rule information and pseudo target label information in Makefile to obtain an executable file generated by compilation.

As a further improvement of the present invention, comprising: calling Make according to a GNU cross compilation environment, and starting a cmd window under a directory corresponding to target Makefile of the to-be-compiled project; calling the cmd window according to a multi-process system, hiding the cmd window according to setting of the multi-process system, and executing redirection output of compiling information of target Makefile, wherein the executable file generated in the compilation process of target Makefile is obtained in an output stream receiving the compiling information.

As a further improvement of the present invention, wherein the variable attribute information of Makefile comprises a source file and reference file path, a link file path, an intermediate file list, a reference file list, a chip core, and a compiler optimization level.

As a further improvement of the present invention, wherein the calling an incremental compiling mechanism of Make according to the automatic configuration information of the universal Makefile template comprises: obtaining a modification date when the universal Makefile template replaces one or more of the dependent files; obtaining a date of target Makefile; judging whether the modification date is later than the date of target Makefile; and when the modification date is later than the date of target Makefile, determining to call the incremental compiling mechanism of Make.

As a further improvement of the present invention, wherein the obtaining a modification date when the universal Makefile template replaces one or more of the dependent files comprises: judging whether one or more of the dependent files are header files and/or inclusive files; when one or more of the dependent files are the header files and/or the inclusive files, determining that the compiling module executes one project clean-up; and deleting the intermediate file of the universal Makefile template according to the one project clean-up to obtain target Makefile.

As a further improvement of the present invention, wherein for the rule information in Makefile, the method comprises: setting a first target appearing in Makefile as a default target; generating a first target file according to a generation rule for the default target; determining a first dependency relationship according to the default target and the first target file; and judging that the modification date of one or more files in the default target is later than that of the first target file according to the first dependency relationship, and determining to execute generation of the first target file.

As a further improvement of the present invention, wherein for the pseudo target label information in Makefile, the method comprises: defining a first pseudo target, the first pseudo target being taken as the default target; designating the first target file as the dependent file of the first pseudo target; generating a plurality of second target files for the dependent file at one time through the first pseudo target according to the rule information in Makefile; defining a second pseudo target; and cleaning up the plurality of second target files at one time according to the second pseudo target.

A multi-chip compatible compiling device, comprising: a first extracting unit configured to obtain Makefile in a file directory, and extract common feature information of Makefile; a first setting unit configured to set variable attribute information of Makefile through a function supported in Makefile; a first obtaining unit configured to obtain a universal Makefile template for plural chips according to the common feature information and the variable attribute information of Makefile; a first determining unit configured to traverse a to-be-compiled project in the universal Makefile template by a compiling module, record dependent file path information of the to-be-compiled project, replace a first variable value in the universal Makefile template, and determine automatic configuration information of the universal Makefile template; a second obtaining unit configured to call an incremental compiling mechanism of Make according to the automatic configuration information of the universal Makefile template to obtain target Makefile of the to-be-compiled project; and a third obtaining unit configured to process target Makefile according to rule information and pseudo target label information in Makefile to obtain an executable file generated by compilation.

A multi-chip compatible compiling device, comprising a memory, a processor and a computer program stored on the memory and executable on the processor, wherein the processor implements the steps of the method of the present invention when executing the program.

A computer-readable storage medium having a computer program stored thereon, which when executed by a processor, implements the steps of the method of the present invention.

The above-mentioned one or more technical solutions in the embodiments of the present application at least have one or more of the following technical effects. The embodiments of the present invention provide the multi-chip compatible compiling method and device, and the multi-chip compatible compiling method includes: obtaining Makefile in the file directory, and extracting the common feature information of Makefile; setting the variable attribute information of Makefile through the function supported in Makefile; obtaining the universal Makefile template for plural chips according to the common feature information and the variable attribute information of Makefile; traversing the to-be-compiled project in the universal Makefile template by the compiling module, recording the dependent file path information of the to-be-compiled project, replacing the first variable value in the universal Makefile template, and determining the automatic configuration information of the universal Makefile template; calling the incremental compiling mechanism of Make according to the automatic configuration information of the universal Makefile template to obtain target Makefile of the to-be-compiled project; and processing target Makefile according to the rule information and the pseudo target label information in Makefile to obtain the executable file generated by compilation, thereby solving the technical problem that most embedded IDEs in the prior art only support compilation of a chip or a chip from a specific manufacturer, resulting in insufficient compilation compatibility and adaptability of the embedded IDE to different microcontrollers, and achieving the technical effect that the universal IDE compiling module has enhanced flexibility and expandability and is applicable to compilation of various chips, thus improving the compiling adaptability.

The foregoing description is only an overview of the technical solutions of the present invention. For clearer understanding of the technical means of the present invention, the present invention may be implemented according to the content of the specification, and to make the foregoing and other objectives, features, and advantages of the present invention clearer and more comprehensible, embodiments of the present invention are described below.

Figure 1:
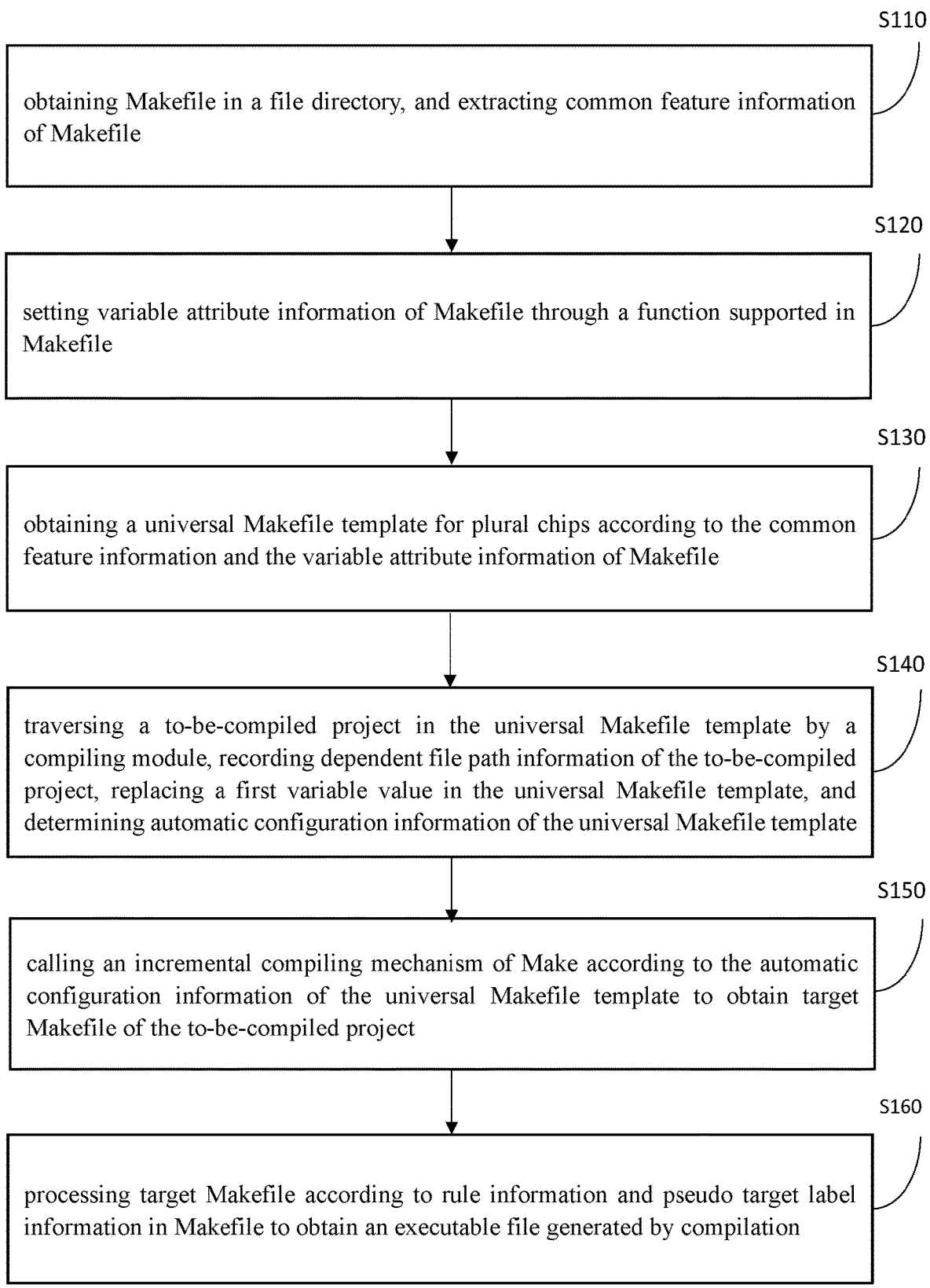
FIG. 1 is a schematic flow chart of a multi-chip compatible compiling method according to an embodiment of the present invention.

Reference numerals: first extracting unit 11, first setting unit 12, first obtaining unit 13, first determining unit 14, second obtaining unit 15, third obtaining unit 16, bus 300, receiver 301, processor 302, transmitter 303, memory 304, and bus interface 306.

DETAILED DESCRIPTION OF PREFERRED EMBODIMENTS

Embodiments of the present invention provide a multi-chip compatible compiling method and device, which are intended to solve the technical problem that most embedded IDEs in a prior art only support compilation of a chip or a chip from a specific manufacturer, resulting in insufficient compilation compatibility and adaptability of the embedded IDE to different microcontrollers.

The technical solution of the present invention has a general idea of: obtaining Makefile in a file directory, and extracting common feature information of Makefile; setting variable attribute information of Makefile through a function supported in Makefile; obtaining a universal Makefile template for plural chips according to the common feature information and the variable attribute information of Makefile; traversing a to-be-compiled project in the universal Makefile template by a compiling module, recording dependent file path information of the to-be-compiled project, replacing a first variable value in the universal Makefile template, and determining automatic configuration information of the universal Makefile template; calling an incremental compiling mechanism of Make according to the automatic configuration information of the universal Makefile template to obtain target Makefile of the to-be-compiled project; and processing target Makefile according to rule information and pseudo target label information in Makefile to obtain an executable file generated by compilation, thereby achieving the technical effect that a universal IDE compiling module has enhanced flexibility and expandability and is applicable to compilation of various chips, thus improving compiling adaptability.

The technical solution of the present invention is described in detail below with reference to the accompanying drawings and embodiments, and it should be understood that the embodiments of the present application and specific features in the embodiments are detailed descriptions of the technical solution of the present application, rather than limitations of the technical solution of the present application, and the embodiments of the present application and the technical features in the embodiments may be combined with each other without conflict.

The term "and/or" herein only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

First Embodiment

FIG. 1 is a schematic flow chart of a multi-chip compatible compiling method according to an embodiment of the present invention. As shown in FIG. 1, the embodiment of the present invention provides a multi-chip compatible compiling method, including:

step 110: obtaining Makefile in a file directory, and extracting common feature information of Makefile.

Specifically, a target file, a dependent file and a corresponding control instruction generated by compilation are specified in Makefile. For a cross compilation mode (GNU), a large number of parameters are required to be configured to correctly compile a to-be-compiled project. In order to improve an efficiency, a GNU collection provides Make to mask various types of GCC compiler instructions, and in turn, a generation process of an underlying program from a code source file to an executable file is controlled dependent on Makefile. For Make, Makefile is more like a script file; according to a relationship between the target file and the source file, Make automatically calls a relevant tool in the GNU collection to complete conversion of a source code to a machine code according to a predetermined instruction. By starting Make, Make may automatically search for a file named Makefile in the current directory. Makefile in the file directory is obtained, and the common feature information of Makefile is extracted.

Step 120: setting variable attribute information of Makefile through a function supported in Makefile.

Further, the variable attribute information of Makefile includes a source file and reference file path, a link file path, an intermediate file list, a reference file list, a chip core, and a compiler optimization level.

Step 130: obtaining a universal Makefile template for plural chips according to the common feature information and the variable attribute information of Makefile.

Specifically, since a chip compilation process involves key information, such as the source file and reference file path, the link file path, the chip core, the optimization level, or the like, according to information required in the actual compilation process, the information, such as the source file and reference file path, the link file path, the intermediate file list, the reference file list, the chip core, the compiler optimization level, or the like, are defined as the variable attribute information of Makefile, which facilitates modification of information of different chips. The functions supported in specific Makefile, such as wildcard, patsubst, or the like, are used in the process of defining these variables. In the variable attribute information of Makefile: (1) a link file is used to link the target file and a library file to generate the executable file, and a location of the link file is required to be specified in the compilation process to instruct Make to complete necessary work. (2) Generated file names define file names of finally generated various target files (including files, such as hex, elf, map, or the like). (3) The .c file and .S/.s file list records paths of all .c files and .S/.s files in the to-be-compiled project. In the compilation process, compilation of each .c file and each .S/.s file is completed separately; in the embodiment of the present application, all to-be-compiled files are stored in the same directory, and an effect of compiling all the files according to one rule is achieved using an obscure rule in Makefile. Compared with other IDEs, a writing operation of Makefile is simplified greatly. (4) A .o file is the target file generated after the compilation of the .c and .S/.s files. In a process of generating a final file, executable files of all .o files are required to be generated according to indications of the link file, and therefore, a list of the .o files (which records file paths) is required to be provided. (5) A current compiler provides different optimization levels to facilitate a developer to make trade-offs regarding code quality, a compilation time, a code size, resource consumption, or the like. According to the common feature information and the variable attribute information of Makefile, general rules are summarized, and the universal Makefile template for plural chips is designed. Makefile mainly contains five parts: a displayed rule, an obscure rule, a variable definition, a file indication and a comment.

Step 140: traversing a to-be-compiled project in the universal Makefile template by a compiling module, recording dependent file path information of the to-be-compiled project, replacing a first variable value in the universal Makefile template, and determining automatic configuration information of the universal Makefile template.

Specifically, after the universal Makefile template for plural chips is designed in step 130, before the compilation operation starts, and if in step 130, paths of the .c\S file and a header file are defined as variables in Makefile, the to-be-compiled project in the universal Makefile template is traversed by the compiling module, the dependent file path information of the to-be-compiled project is recorded, the first variable value in the universal Makefile template is replaced, and the automatic configuration information of the universal Makefile template is completed, such that results of file addition and deletion may be updated in time before the compilation starts. The first variable value is the paths of the .c\S file and the header file, or the like. For example, taking a KDS development environment as an example, after file-level addition or deletion of the to-be-compiled project, file information of the to-be-compiled project is frequently required to be reconfigured to update information contained in the file during the compilation process, so as to prevent a compilation error that a certain file does not exist or is not included. Such a configuration method brings a lot of inconvenience to operations of a user when there exist many project files and deep paths, and after the automatic configuration of the Makefile template, this process is completely transparent to the user, thus facilitating the operation of the user.

Step 150: calling an incremental compiling mechanism of Make according to the automatic configuration information of the universal Makefile template to obtain target Makefile of the to-be-compiled project.

Further, the calling an incremental compiling mechanism of Make according to the automatic configuration information of the universal Makefile template includes: obtaining a modification date when the universal Makefile template replaces one or more of the dependent files; obtaining a date of target Makefile; judging whether the modification date is later than the date of target Makefile; and when the modification date is later than the date of target Makefile, determining to call the incremental compiling mechanism of Make.

Further, the obtaining a modification date when the universal Makefile template replaces one or more of the dependent files includes: judging whether one or more of the dependent files are header files and/or inclusive files; when one or more of the dependent files are the header files and/or the inclusive files, determining that the compiling module executes one project clean-up; and deleting the intermediate file of the universal Makefile template according to the one project clean-up to obtain target Makefile.

Specifically, this operation facilitates the developer to view the compiled final files (such as map files, 1st files, or the like) and process the intermediate files (.o and .d files). Before the compilation, C files and assembling files required by the compilation are automatically copied to newly built srcc and srcs folders; meanwhile, an obj folder is newly built for storing the intermediate files generated by the compilation, and the final files and Makefile generated by the compilation are generated in a peer directory. If the source file is copied to a corresponding directory before the compilation starts each time, timeliness of the source file in the compilation process may be guaranteed, but the deletion and copying operations of the file influence an execution speed of the whole compilation process to a certain extent. The date of target Makefile is obtained by obtaining the modification date when the universal Makefile template replaces one or more of the dependent files. That is, before executing the source file copying operation, the compiling module compares the modification date of the to-be-copied source file under the current to-be-compiled project with the modification date of a file with a same name under a directory of target Makefile. Whether the modification date is later than the date of target Makefile is judged, and when the modification date is later than the date of target Makefile, the incremental compiling mechanism of Make is determined to be called, and a file copying and covering operation is executed to determine target Makefile of the to-be-compiled project. Only the modified source file is operated before the compilation starts each time, thus greatly simplifying intermediate flow and accelerating the execution speed of the compilation. If header files or other inclusive files (such as .inc files) are modified during a development process, the compiling module performs one project clean-up operation before the next compilation operation to delete all intermediate files, and then perform actual compilation of the source file. Firstly, whether one or more of the dependent files are the header files and/or the inclusive files is judged, and the compiling module is determined to execute the one project clean-up when one or more of the dependent files are the header files and/or the inclusive files. The intermediate files of the universal Makefile template are deleted according to the one project clean-up to obtain target Makefile, and all target Makefile is recompiled, thus preventing modified files from being introduced into target Makefile, and guaranteeing correctness of the modified compiling result.

Step 160: processing target Makefile according to rule information and pseudo target label information in Makefile to obtain an executable file generated by compilation.

Further, for the rule information in Makefile, the method includes: setting a first target appearing in Makefile as a default target; generating a first target file according to a generation rule for the default target; determining a first dependency relationship according to the default target and the first target file; and judging that the modification date of one or more files in the default target is later than that of the first target file according to the first dependency relationship, and determining to execute generation of the first target file.

Specifically, the rules in Makefile describe a generation way of the target file in the compilation process, and the rules contained in Makefile specifically include: (1) displayed rule. The displayed rule indicates the target file of the compilation process, the dependent source file, and the associated instruction for generating the target file. (2) Obscure rule. As opposed to the displayed rule, the obscure rule supports abbreviated writing commands, and Make may use an auto-derivation function to derive file dependency relationships and generate commands. For example, in Makefile, a group of dependent files may be specified for plural target files in a same folder, and corresponding relationships between the target files and the dependent files and the related commands are not required to be displayed and described. (3) Variable definition. Variables are similar to variables in macro definitions in C, are generally strings, and are replaced to corresponding reference locations during execution of Makefile. (4) File indication. The file indication is similar to the include keyword of C and may include other Makefile. When the compilation project is huge and involves a large number of intermediate files and dependent files, and particularly, the files are difficult to store in the same directory, compilation of the whole project may be fragmented utilizing a lot of Makefile. (5) Comment. Unlike common programming languages, Makefile has only line comments which have to begin with the character "#". The first target appearing in Makefile is set as the default target and the first target file is generated according to a principle that the generation rule for the default target is executed certainly. The first dependency relationship is determined according to the default target and the first target file; that is, the default target is a file on which the generation of the first target file is dependent, or another target file. The modification date of one or more files in the default target is judged to be later than that of the first target file according to the first dependency relationship therebetween, and the generation of the first target file is determined to be executed; that is, the executable file generated by the compilation is obtained.

Further, for the pseudo target label information in Makefile, the method includes: defining a first pseudo target, the first pseudo target being taken as the default target; designating the first target file as the dependent file of the first pseudo target; generating a plurality of second target files for the dependent file at one time through the first pseudo target according to the rule information in Makefile; defining a second pseudo target; and cleaning up the plurality of second target files at one time according to the second pseudo target.

Specifically, the pseudo target is only a label instead of a file, and therefore, Make may not generate the dependency relationship thereof and decide whether the pseudo target is to be executed. Operations which may not be completed by a common file target and rule may be implemented using this characteristic of the pseudo target, such that a plurality of targets including an executable file, a map file and an 1st file may be generated by one making operation using the characteristic of the pseudo target. First, the first pseudo target, such as a first pseudo target "all", is defined, and the first pseudo target is taken as the default target of target Makefile. The first target file is designated as the dependent file of the first pseudo target. According to the principle that the rule of the default target is executed certainly, all the generation rules of the dependent files are executed; that is, the plurality of second target files are generated for the dependent file at one time through the first pseudo target according to the rule information in Makefile. The second pseudo target, such as a second pseudo target "clean", is defined, and a one-time clean-up command is executed according to the second pseudo target, so as to clean up the plurality of second target files at one time and achieve a special compiling effect.

Further, the method includes: calling Make according to a GNU cross compilation environment, and starting a cmd window under a directory corresponding to target Makefile of the to-be-compiled project; calling the cmd window according to a multi-process system, hiding the cmd window according to setting of the multi-process system, and executing redirection output of compiling information of target Makefile, wherein the executable file generated in the compilation process of target Makefile is obtained in an output stream receiving the compiling information.

Specifically, after a compilation collection of the cross compilation mode is correctly installed, calling of Make under the Windows platform may be realized through the cmd window. The cmd window is started under the directory corresponding to target Makefile of the to-be-compiled project, the cmd window is called according to the multi-process system, display of the cmd window is hidden according to the setting of the multi-process system, and the redirection output of the compiling information of target Makefile is performed, so as to complete the compilation of the to-be-compiled project. The executable file generated in the compilation process of target Makefile is obtained from the output stream receiving the compiling information, thus realizing the redirection output of the compiling information; correct output information in the compilation process and final generation result information of the executable file may be obtained from a processing function bound to the redirection output of the compiling information, and once a warning or an error occurs in the compilation process, a response function of the redirection output of the compiling information may be triggered.

Further, the multi-chip compatible compiling method for universal Makefile according to the present embodiment may also be implemented in conjunction with an artificial intelligence (AI) technology; AI is also called machine intelligence, is a subject for researching how to allow a computer to simulate certain thinking processes and intelligent behaviors (such as learning, reasoning, thinking, planning, or the like) of a human, and mainly includes a principle for intelligence of the computer and manufacture of a computer similar to human brain intelligence, such that the computer may realize higher-level applications. The method includes the following specific steps: obtaining a picture of Makefile; inputting the picture of Makefile into a model, the model being trained by a machine learning technology using plural groups of data, and each group of the plural groups of data including: Makefile, first identification information for identifying common features of Makefile and second identification information for identifying variable attributes of Makefile; and acquiring output information of the model, the output information being the universal Makefile template, and the output information of the model being the universal Makefile template designed using the common features and the variable attributes of Makefile in the first identification information and the second identification information. Then, variable values are automatically configured for the universal Makefile template according to the to-be-compiled project, the intermediate file is cleaned up according to the incremental compiling mechanism to determine to-be-compiled target Makefile, and Make is called to process target Makefile in conjunction with the rule information and the pseudo target in Makefile to obtain the executable file generated by the compilation.

Further, the training model in the present embodiment is trained by the machine learning technology using the plural groups of data, and the machine learning technology is a way to realize AI, has certain similarity with a data mining technology, is also a multi-field cross subject, and relates to plural subjects, such as probability theory, statistics, approximation theory, convex analysis, calculation complexity theory, or the like. Compared with the data mining technology in which mutual characteristics are found among big data, the machine learning technology focuses more on design of an algorithm, and therefore, the computer may automatically learn rules from the data and predict unknown data using the rules.

Further, the method includes: dividing a storage space of ARMCC according to a scatter loading file, and determining a storage address of first-class data of the executable file; setting an initial address of a stack pointer under ARMCC; judging whether an interrupt vector table is copied to a RAM region and then modified dynamically under an ARMCC compilation environment; when the interrupt vector table is copied to the RAM region and then modified dynamically under the ARMCC compilation environment, determining to keep the interrupt vector table; and determining that a universal BIOS of a terminal is suitable for the ARMCC compilation environment according to the storage address of the first-class data of the divided executable file, the set initial address of the stack pointer and the dynamic modification of the interrupt vector table.

Further, the method includes: obtaining a first support file under a GNU cross compilation environment; obtaining a second support file under an ARMCC compilation environment; importing the to-be-compiled project into the ARMCC compilation environment, and determining first replacement information, the first replacement information including replacement of the first support file with the second support file; obtaining a first start-up file of a first chip under the GNU cross compilation environment; obtaining a first start-up file of a second chip under the ARMCC compilation environment; importing the to-be-compiled project into the ARMCC compilation environment, and determining second replacement information, the second replacement information including replacement of the first start-up file with the second start-up file; determining that the GNU cross compilation environment has first compatibility with the ARMCC compilation environment according to the first replacement information and the second replacement information.

Further, the method includes: obtaining an effective link file under a GCC; copying and transferring the effective link file to a corresponding directory of the to-be-compiled project, and determining the storage address of the first-class data of the executable file divided in the second chip under the ARMCC compilation environment.

Specifically, compilation is a process of generating machine codes which may be identified and operated by a MCU, is closely related to a model, kernel, used library file, or the like, of the MCU and is a premise for checking code quality and a system operation effect. Compilation adaptability is shown in two aspects: chip adaptability that the IDE supports compilation of MCU projects of different series and manufacturers; and compilation environment adaptability that projects under different compilers may be adapted to secondary development of the projects under different compilers with a compatibility processing operation of the IDE.

In the embodiment of the present application, the compatibility processing operation for the ARMCC environment is performed; first, the storage space of ARMCC is divided according to the scatter loading file, and the storage address of the first-class data of the executable file is determined, the first-class data being various types of data of the executable file. The initial address of the stack pointer under ARMCC is set, a default value of the stack pointer under the GCC compilation environment is a highest address of a RAM, the stack pointer under the ARMCC compilation environment has no initial value, and the initial value thereof is related to a specific stack and a stack size set by the project. Therefore, for a user program in the ARMCC environment, the initial address of the stack pointer is required to be set manually, so as to guarantee a correct stack status during "second reset" of a system. Whether the interrupt vector table is copied to the RAM region and then modified dynamically under the ARMCC compilation environment is judged, and when the interrupt vector table is copied to the RAM region and then modified dynamically under the ARMCC compilation environment, the interrupt vector table is determined to be kept. The universal BIOS of a terminal is determined to be suitable for the ARMCC compilation environment according to the storage address of the first-class data of the divided executable file, the set initial address of the stack pointer and the dynamic modification of the interrupt vector table. If a method of rewriting the interrupt vector table through a Flash operation is adopted, division of a Flash memory space is required to be readjusted under the ARMCC compilation environment.

Since the GCC and the ARMCC compilation environment have different working mechanisms, corresponding support files also have some differences. During achievement of the compatibility of the project under the two compilation environments, part of files are required to be replaced to support work of corresponding compilers. First, the first support file under the GNU cross compilation environment and the second support file under the ARMCC compilation environment are obtained. The to-be-compiled project is imported into the ARMCC compilation environment, and the first support file is determined to be replaced with the second support file. Then, the first start-up file of the first chip under the GNU cross compilation environment and the first start-up file of the second chip under the ARMCC compilation environment are obtained. The to-be-compiled project is imported into the ARMCC compilation environment, and the first start-up file is determined to be replaced with the second start-up file. The GNU cross compilation environment is determined to have the first compatibility with the ARMCC compilation environment according to the first replacement information and the second replacement information.

Since no link file exists in the ARMCC environment, when the to-be-compiled project in this environment is imported, an effective link file (stored in a development environment installation directory as a template) of STM32L431Rc in the GCC is required to be copied to the directory corresponding to the target project, so as to guarantee the correct division of the storage space of the chip during the compilation. Firstly, the effective link file under the GCC is obtained and copied and transferred to the corresponding directory of the to-be-compiled project, and the storage address of the first-class data of the executable file divided in the second chip under the ARMCC compilation environment is determined, thereby improving the adaptability to the compilation environment, and comprehensively improving the compiling compatibility.

Second Embodiment

Figure 2:
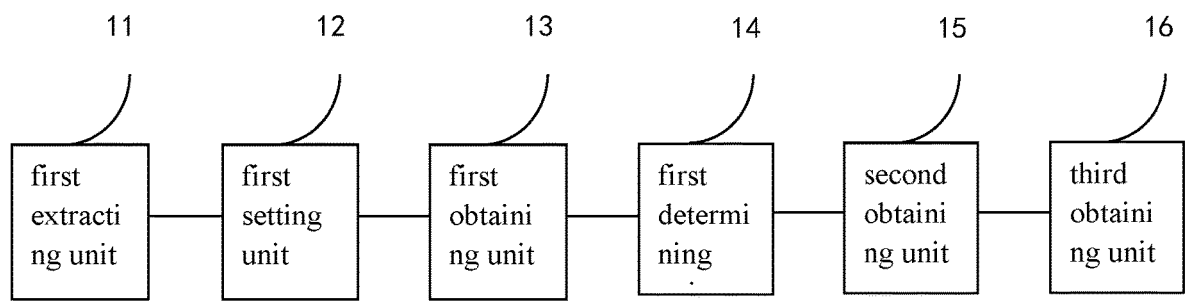
FIG. 2 is a schematic structural diagram of a multi-chip compatible compiling device according to an embodiment of the present invention.

Based on the same inventive concept as the multi-chip compatible compiling method according to the foregoing embodiment, the present invention further provides a multi-chip compatible compiling device, and as shown in FIG. 2, the device includes: a first extracting unit 11 configured to obtain Makefile in a file directory, and extract common feature information of Makefile; a first setting unit 12 configured to set variable attribute information of Makefile through a function supported in Makefile; a first obtaining unit 13 configured to obtain a universal Makefile template for plural chips according to the common feature information and the variable attribute information of Makefile; a first determining unit 14 configured to traverse a to-be-compiled project in the universal Makefile template by a compiling module, record dependent file path information of the to-be-compiled project, replace a first variable value in the universal Makefile template, and determine automatic configuration information of the universal Makefile template; a second obtaining unit 15 configured to call an incremental compiling mechanism of Make according to the automatic configuration information of the universal Makefile template to obtain target Makefile of the to-be-compiled project; and a third obtaining unit 16 configured to process target Makefile according to rule information and pseudo target label information in Makefile to obtain an executable file generated by compilation.

Further, the device includes: a first operating unit configured to call Make according to a GNU cross compilation environment, and start a cmd window under a directory corresponding to target Makefile of the to-be-compiled project; and a second operating unit configured to call the cmd window according to a multi-process system, hide the cmd window according to setting of the multi-process system, and execute redirection output of compiling information of target Makefile, wherein the executable file generated in the compilation process of target Makefile is obtained in an output stream receiving the compiling information.

Further, the variable attribute information of Makefile includes a source file and reference file path, a link file path, an intermediate file list, a reference file list, a chip core, and a compiler optimization level.

Further, for the calling an incremental compiling mechanism of Make according to the automatic configuration information of the universal Makefile template, the device includes: a fourth obtaining unit configured to obtain a modification date when the universal Makefile template replaces one or more of the dependent files; a fifth obtaining unit configured to obtain a date of target Makefile; a first judging unit configured to judge whether the modification date is later than the date of target Makefile; and a second determining unit configured to, when the modification date is later than the date of target Makefile, determine to call the incremental compiling mechanism of Make.

Further, for the obtaining a modification date when the universal Makefile template replaces one or more of the dependent files, the device includes: a second judging unit configured to judge whether one or more of the dependent files are header files and/or inclusive files; a third determining unit configured to, when one or more of the dependent files are the header files and/or the inclusive files, determine that the compiling module executes one project clean-up; and a sixth obtaining unit configured to delete the intermediate file of the universal Makefile template according to the one project clean-up to obtain target Makefile.

Further, for the rule information in Makefile, the device includes: a second setting unit configured to set a first target appearing in Makefile as a default target; a first generating unit configured to generate a first target file according to a generation rule for the default target; a fourth determining unit configured to determine a first dependency relationship according to the default target and the first target file; and a fifth determining unit configured to judge that the modification date of one or more files in the default target is later than that of the first target file according to the first dependency relationship, and determine to execute generation of the first target file.

Further, for the pseudo target label information in Makefile, the device includes: a first defining unit configured to define a first pseudo target, the first pseudo target being taken as the default target; a third operating unit configured to designate the first target file as the dependent file of the first pseudo target; a second generating unit configured to generate a plurality of second target files for the dependent file at one time through the first pseudo target according to the rule information in Makefile; a second defining unit configured to define a second pseudo target; and a fourth operating unit configured to clean up the plurality of second target files at one time according to the second pseudo target.

Various modifications and specific instances of the multi-chip compatible compiling method according to the first embodiment of FIG. 1 are also applicable to the multi-chip compatible compiling device according to the present embodiment, and an implementation method of the multi-chip compatible compiling device according to the present embodiment will be clear to those skilled in the art from the foregoing detailed description of the multi-chip compatible compiling method, such that the details thereof will not be described herein for the sake of brevity of the specification.

Third Embodiment

Figure 3:
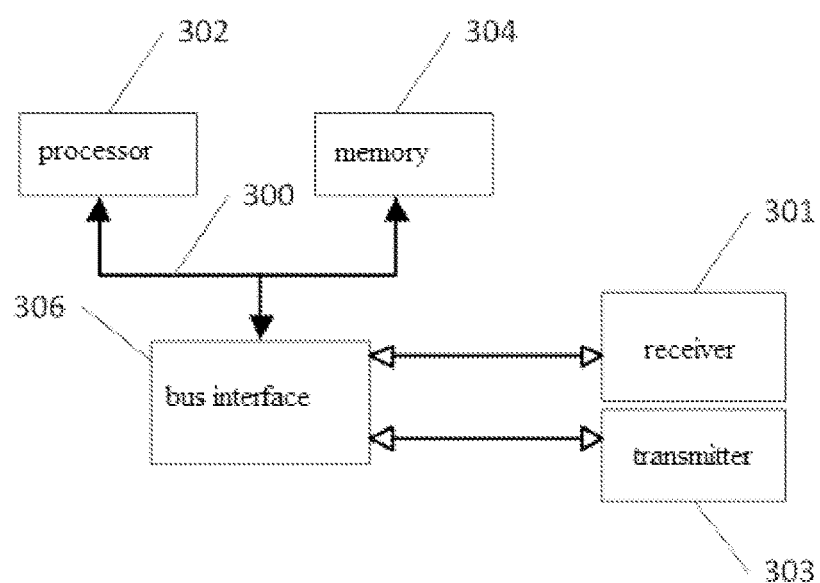
FIG. 3 is a schematic structural diagram of another multi-chip compatible compiling device according to an embodiment of the present invention.

Based on the same inventive concept as the multi-chip compatible compiling method according to the foregoing embodiment, the present invention further provides a multi-chip compatible compiling device, and as shown in FIG. 3, the device includes: a memory 304, a processor 302, and a computer program stored in the memory 304 and executable on the processor 302, the processor 302 implementing the steps of any one of the above multi-chip compatible compiling methods when executing the program.

FIG. 3 shows a bus architecture (represented by bus 300), the bus 300 may include any number of interconnected buses and bridges, and the bus 300 links together various circuits including one or more processors represented by processor 302 and a memory represented by memory 304. The bus 300 may also link together various other circuits, such as peripherals, voltage regulators, power management circuits, or the like, which are well known in the art, and therefore will not be described any further herein. A bus interface 306 provides an interface between the bus 300 and a receiver 301 and a transmitter 303. The receiver 301 and the transmitter 303 may be one element (i.e., a transceiver) for providing a unit for communication with various other devices over a transmission medium. The processor 302 is responsible for management of the bus 300 and general processing operations, and the memory 304 may be configured to store data used by the processor 302 in performing operations.

Fourth Embodiment

Based on the same inventive concept as the multi-chip compatible compiling method according to the foregoing embodiment, the present invention further provides a computer-readable storage medium having a computer program stored thereon, which when executed by a processor, implements the steps of: obtaining Makefile in a file directory, and extracting common feature information of Makefile; setting variable attribute information of Makefile through a function supported in Makefile; obtaining a universal Makefile template for plural chips according to the common feature information and the variable attribute information of Makefile; traversing a to-be-compiled project in the universal Makefile template by a compiling module, recording dependent file path information of the to-be-compiled project, replacing a first variable value in the universal Makefile template, and determining automatic configuration information of the universal Makefile template; calling an incremental compiling mechanism of Make according to the automatic configuration information of the universal Makefile template to obtain target Makefile of the to-be-compiled project; and processing target Makefile according to rule information and pseudo target label information in Makefile to obtain an executable file generated by compilation.

In an implementation process, the program may further implement any one of the method steps in the first embodiment when executed by the processor.

The above-mentioned one or more technical solutions in the embodiments of the present application at least have one or more of the following technical effects. The embodiments of the present invention provide the multi-chip compatible compiling method and device, and the multi-chip compatible compiling method includes: obtaining Makefile in the file directory, and extracting the common feature information of Makefile; setting the variable attribute information of Makefile through the function supported in Makefile; obtaining the universal Makefile template for plural chips according to the common feature information and the variable attribute information of Makefile; traversing the to-be-compiled project in the universal Makefile template by the compiling module, recording the dependent file path information of the to-be-compiled project, replacing the first variable value in the universal Makefile template, and determining the automatic configuration information of the universal Makefile template; calling the incremental compiling mechanism of Make according to the automatic configuration information of the universal Makefile template to obtain target Makefile of the to-be-compiled project; and processing target Makefile according to the rule information and the pseudo target label information in Makefile to obtain the executable file generated by compilation, thereby solving the technical problem that most embedded IDEs in the prior art only support compilation of a chip or a chip from a specific manufacturer, resulting in insufficient compilation compatibility and adaptability of the embedded IDE to different microcontrollers, and achieving the technical effect that the universal IDE compiling module has enhanced flexibility and expandability and is applicable to compilation of various chips, thus improving the compiling adaptability.

Those skilled in the art may understand that the present invention may be embodied by a method, a system or a computer program product. Therefore, the present invention may be embodied completely by hardware, software or by a combination of software and hardware. In addition, the present invention may be embodied by a computer program product implemented in one or more computer available storage media including computer available program code (including but not limited to a disk memory, a CD-ROM, an optical memory, etc.).

REFERENCE NUMERALS

FIG. 1

S110: obtaining Makefile in a file directory, and extracting common feature information of Makefile S120: setting variable attribute information of Makefile through a function supported in Makefile S130: obtaining a universal Makefile template for plural chips according to the common feature information and the variable attribute information of Makefile S140: traversing a to-be-compiled project in the universal Makefile template by a compiling module, recording dependent file path information of the to-be-compiled project, replacing a first variable value in the universal Makefile template, and determining automatic configuration information of the universal Makefile template S150: calling an incremental compiling mechanism of Make according to the automatic configuration information of the universal Makefile template to obtain target Makefile of the to-be-compiled project S160: processing target Makefile according to rule information and pseudo target label information in Makefile to obtain an executable file generated by compilation FIG. 2
11: first extracting unit
12: first setting unit
13: first obtaining unit
14: first determining unit
15: second obtaining unit
16: third obtaining unit FIG. 3
302: processor
304: memory
306: bus interface
301: receiver
303: transmitter

What is claimed is:

1. A multi-chip compatible compiling method, comprising: obtaining Makefile in a file directory, extracting common feature information of Makefile; setting variable attribute information of Makefile through a function supported in Makefile; obtaining a universal Makefile template for plural chips according to the common feature information and the variable attribute information of Makefile; traversing a to-be-compiled project in the universal Makefile template by a compiling module, recording dependent file path information of the to-be-compiled project, replacing a variable value in the universal Makefile template, determining automatic configuration information of the universal Makefile template; calling an incremental compiling mechanism of Make according to the automatic configuration information of the universal Makefile template to obtain target Makefile of the to-be-compiled project; and processing target Makefile according to rule information and pseudo target label information in Makefile to obtain an executable file generated by compilation.

2. The method according to claim 1, comprising: calling Make according to a GNU cross compilation environment, and starting a cmd window under a directory corresponding to target Makefile of the to-be-compiled project; calling the cmd window according to a multi-process system, hiding the cmd window according to setting of the multi-process system, and executing redirection output of compiling information of target Makefile, wherein the executable file generated in the compilation process of target Makefile is obtained in an output stream receiving the compiling information.

3. The method according to claim 1, wherein the variable attribute information of Makefile comprises a source file and reference file path, a link file path, an intermediate file list, a reference file list, a chip core, and a compiler optimization level.

4. The method according to claim 1, wherein the calling an incremental compiling mechanism of Make according to the automatic configuration information of the universal Makefile template comprises: obtaining a modification date when the universal Makefile template replaces one or more of dependent files; obtaining a date of target Makefile; judging whether the modification date is later than the date of target Makefile; and when the modification date is later than the date of target Makefile, determining to call the incremental compiling mechanism of Make.

5. The method according to claim 4, wherein the obtaining a modification date when the universal Makefile template replaces one or more of the dependent files comprises: judging whether one or more of the dependent files are header files and/or inclusive files; determining that the compiling module executes one project clean-up; and deleting an intermediate file of the universal Makefile template according to the one project clean-up to obtain target Makefile.

6. The method according to claim 4, wherein for the rule information in Makefile, the method comprises: setting a first target appearing in Makefile as a default target; generating a first target file according to a generation rule for the default target; determining a first dependency relationship according to the default target and the first target file; and judging that the modification date of one or more files in the default target is later than that of the first target file according to the first dependency relationship, and determining to execute generation of the first target file.

7. The method according to claim 6, wherein for the pseudo target label information in Makefile, the method comprises: defining a first pseudo target, the first pseudo target being taken as the default target; designating the first target file as the dependent file of the first pseudo target; generating a plurality of second target files for the dependent file at one time through the first pseudo target according to the rule information in Makefile; defining a second pseudo target; and cleaning up the plurality of second target files at one time according to the second pseudo target.

8. A multi-chip compatible compiling device, comprising: an extracting unit using a processor configured to obtain Makefile in a file directory and to extract common feature information of Makefile; a setting unit using a processor configured to set variable attribute information of Makefile through a function supported in Makefile; a first obtaining unit using a processor configured to obtain a universal Makefile template for plural chips according to the common feature information and the variable attribute information of Makefile; a determining unit using a processor configured to traverse a to-be-compiled project in the universal Makefile template by a compiling module, to record dependent file path information of the to-be-compiled project, to replace a variable value in the universal Makefile template, and to determine automatic configuration information of the universal Makefile template; a second obtaining unit using a processor configured to call an incremental compiling mechanism of Make according to the automatic configuration information of the universal Makefile template to obtain target Makefile of the to-be-compiled project; and a third obtaining unit using a processor configured to process target Makefile according to rule information and pseudo target label information in Makefile to obtain an executable file generated by compilation.

* * * * *